United States Patent

[11] 3,616,458

| [72] | Inventor | Yosimaro Moriya<br>15-23, 4-chome, Omori Kita, Ota-ku, Tokyo-to, Japan |
|---|---|---|
| [21] | Appl. No. | 889,724 |
| [22] | Filed | Dec. 31, 1969 |
| [23] | | Division of Ser. No. 596,598, Nov. 23, 1966, abandoned |
| [45] | Patented | Oct. 26, 1971 |
| [32] | Priorities | Feb. 9, 1966 |
| [33] | | Japan |
| [31] | | 41/7504;<br>Aug. 2, 1966, Japan, No. 41/50971 |

[54] APPARATUS FOR ACTIVATING INTERNAL SURFACES OF PLASTIC HOLLOW ARTICLES
3 Claims, 5 Drawing Figs.

[52] U.S. Cl. .................................................. 204/312, 204/165, 204/168
[51] Int. Cl. .................................................. B01k 1/00, H01t 19/04
[50] Field of Search .......................................... 204/165, 312, 168

[56] References Cited
UNITED STATES PATENTS

| 3,057,792 | 10/1962 | Frohlich | 204/165 |
| 3,166,488 | 1/1965 | Makowski | 204/312 |
| 3,182,103 | 5/1965 | Blaylock et al. | 204/312 X |
| 3,288,638 | 11/1966 | Van Paassen et al. | 204/312 X |

Primary Examiner—F. C. Edmundson
Attorney—Wenderoth, Lind & Ponack

ABSTRACT: An apparatus for activating the inner surface of a hollow article of plastic by glow discharge in an evacuated vessel. A bare discharge electrode is inserted into the hollow article without contacting the side and bottom portions of the inner surface and glow discharge is established between the bare discharge electrode and a counterelectrode by energizing them from a source of supply having a drooping voltage-current characteristic.

PATENTED OCT 26 1971  3,616,458
FIG. 1  FIG. 2  FIG. 3
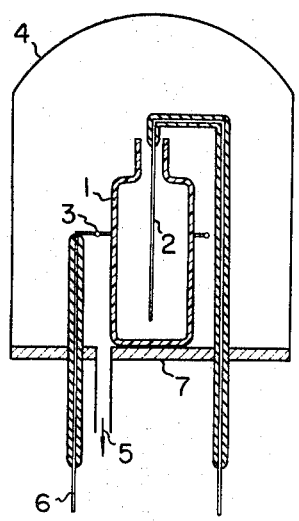
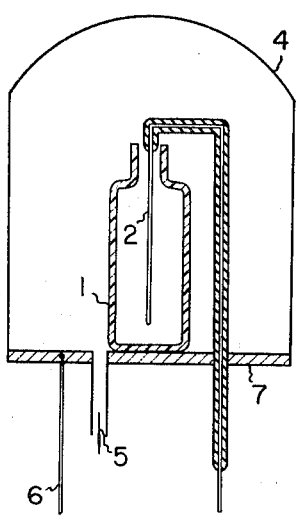
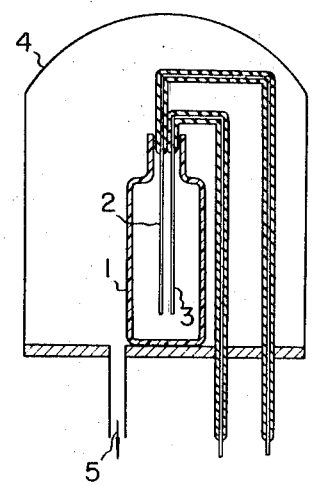
FIG. 5  FIG. 4
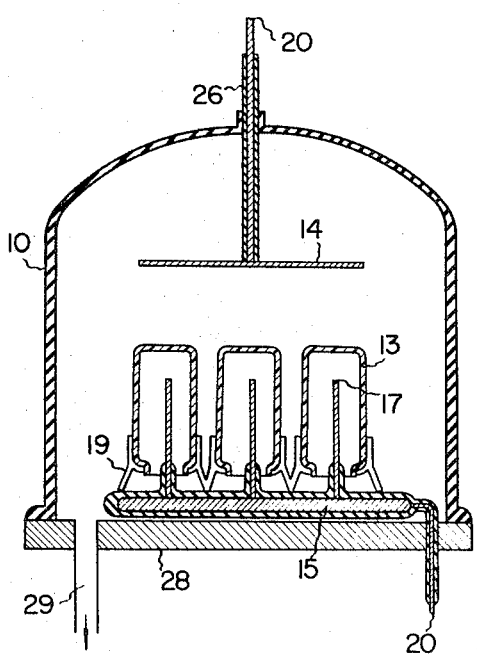
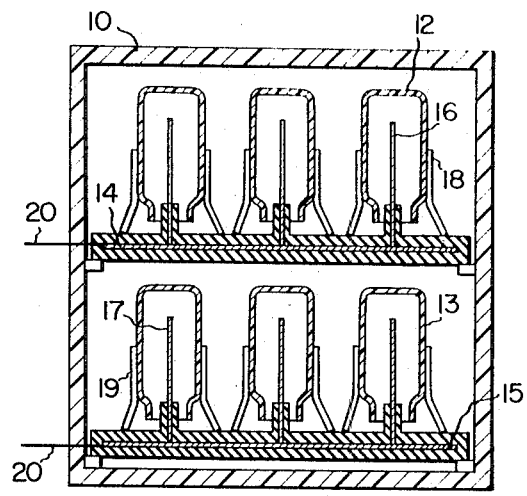
Yosimaro Moriya,
INVENTOR
BY Wenderoth,
Lind and Ponack,
attorneys

APPARATUS FOR ACTIVATING INTERNAL SURFACES OF PLASTIC HOLLOW ARTICLES

This application is a division of application Ser. No. 596,598 filed Nov. 23, 1966, now abandoned. This invention relates to an improved apparatus for activating the internal surfaces of hollow articles made of electrically nonconductive plastic material and more particularly to an improved apparatus for activating the internal surfaces of hollow articles, such as bottles or tubes having necks of small diameter or small inner diameter, made of various non conductive plastic materials, e.g. polyethylene, polypropylene, and polyester resin.

It is well known in the art to activate the surfaces of plastic articles by subjecting them to a gas flame, high-voltage electron beam bombardment, or glow discharge in an atmosphere of reduced pressure. By these treatments their surfaces are activated so that they can be wet by water or readily printed with printing inks, or other substances such as an epoxy resin can be cemented thereto.

However, where the internal surfaces of plastic bottles, tubes or other hollow articles are to be activated by glow discharge in a low-pressure atmosphere, this method of activation is not suitable for bottles having small necks or tubes having a small internal diameter. For example, when bottles of polyethylene are placed in the field of glow discharge created in an atmosphere of reduced pressure, if the inside diameter of the bottles is small, a negative charge will be accumulated on the inner surfaces of the bottle necks, thus preventing the glow discharge from entering into the interior of the bottles. Thus, activation of the inner surfaces of bottles becomes impossible.

The principal object of this invention is to provide a novel method of activating the inner surfaces of bottles having narrow necks or tubes of small inner diameter, made of plastic material. By small inner diameter is meant an inner diameter which has a size such that a negative charge will be accumulated on the inner surface of the narrow neck or tube such that a glow discharge is prevented from entering into the interior of the bottle or tube.

Another object of this invention is to provide an apparatus for activating the inner surfaces of such bottles or tubes on a mass production scale.

Briefly stated, according to this invention, there is provided a novel method of activating the inner surface of a hollow article made of nonconductive plastic which cannot be wet by liquids or is permeable to gas, said method comprising the steps of inserting at least one discharge electrode into the hollow articles, portions of said discharge electrode outside of said hollow article being electrically insulated so as not to create glow discharge, and subjecting said inner surface to the action of glow discharge created by said discharge electrode thereby to improve the bonding property of said inner surface.

In carrying this method into practice, a single discharge electrode may be inserted in the hollow article to cooperate with a counterelectrode which is located outside of the hollow body, and which may take the form of a ring surrounding the hollow body or a conductor plate supporting the same. Alternatively, a pair of spaced-apart discharge electrodes may be inserted in the hollow article to establish glow discharge therebetween.

According to another aspect of this invention, there is provided an apparatus for simultaneously activating the inner surfaces of a plurality of hollow articles made of nonconductive plastic comprising a supporting frame of an electric insulating material and disposed in an evacuated vessel, a plurality of spaced-apart conductive members supported by said frame, a plurality of spaced apart discharge electrodes provided for each of the conductive members, said discharge electrodes being connected to said conductive members and adapted to be inserted into a plurality of hollow articles, means to support said articles on said conductive members and said discharge electrodes except portions thereof to be inserted into said hollow articles, and means to connect said conductive members to a source of power to establish glow discharge between said discharge electrodes on different conductive members thereby to simultaneously activate the inner surfaces of said hollow articles. It is preferable to install said conductive members in pairs and to connect alternate conductive members to opposite terminals of said source of power, which is preferably a means having drooping voltage-current characteristic such as a leakage transformer.

While the specification concludes with claims particularly pointing out and distinctly claiming the subject matter which I regard as my invention, it is believed that the invention will be better understood from the following description taken in connection with the accompanying drawings, in which:

FIGS. 1, 2 and 3 are sectional views of three different types of apparatus utilized to carry out the novel method;

FIG. 4 is a sectional view of an apparatus suitable for activating a number of bottles at one time; and FIG. 5 is a sectional view of a modification of the apparatus shown in FIG. 4.

Referring now to FIG. 1 of the accompanying drawings, there is shown a polyethylene bottle 1 contained in an evacuated vessel or jar 4. The bottle shown has a total length of 170 mm., an outside diameter of 45 mm., a length of the neck of 20 mm., and an inner diameter of the neck of 14 mm. In accordance with this invention a discharge electrode, preferably in the form of a copper wire of 1-mm. diameter, is inserted into the bottle through the open top end of the bottle. Portions of the electrode 1 outside of the bottle are coated by a suitable electric insulator, polyethylene for example, so that no corona discharge will be created at these portions. The other or counterelectrode 3 is disposed outside the bottle to cooperate with the electrode 2. While the counter electrode 3 may take various forms, in the embodiment shown in FIG. 1 it is shown as a ring supported by an insulated lead wire 6 to surround the bottle 1. In the modified embodiment shown in FIG. 2, the base 7 of the evacuated vessel 4 is made of metal and serves as the counterelectrode.

In still another modification shown in FIG. 3, a pair of parallel electrodes 2 and 3 of opposite polarities are inserted into the bottle to cause glow discharge between these electrodes. In an actual case of a bottle having the physical dimensions described above, the length of the discharge electrode 2 or 3 was 140 mm. The vessel 4 was evacuated by a suitable vacuum producing means, not shown, to a pressure of 0.1 to 0.5 torr through an exhaust port 5. Glow discharge was created by utilizing a leakage transformer (not shown) having a secondary rating of 3,000 V., 22 ma. As is well known in the art glow discharge has negative resistance so that it is necessary to use a source of supply having a drooping voltage-current characteristic, such as a leakage transformer or which reduces rapidly its secondary voltage as the secondary current tends to increase. Otherwise glow discharge grows into an arc, thus damaging articles to be treated. It is to be understood that such a source of supply is used for all embodiments of this invention. The discharge current was 18 ma. in the case of FIG. 1, and 22 ma. in cases of FIGS. 2 and 3. In each case, the inner surface of the polyethylene bottle 1 was activated so as to become wettable by water by the treatment with a glow discharge for a period of more than 20 seconds.

As an example, polyvinydine chloride sold under the trade name of Saran was dissolved in a solvent, the solution was coated on the inner surface of the bottle, and then the solvent was vaporized to form a thin film of Saran strongly bonded to the inner surface of the bottle 1. It was found that an epoxy resin cementing agent could also be caused to adhere firmly. Thus, according to the method of treatment of this invention, it is possible to effect a satisfactory activation treatment even when the inner diameters of the necks of bottles or tubes are small. Thus, for example, the permeability of polyethylene bottles can be greatly reduced by bonding to the internal surfaces thereof thin films of other plastic material having very low permeability to gas as, for example, Saran.

FIG. 4 shows an apparatus for treating a number of hollow plastic articles at one time. In FIG. 4 a plurality of inverted plastic bottles 12 and 13 are supported by supporting legs 18 and 19 made of a suitable insulator on electric conductive members shown as plate electrodes 14 and 15 or shelves which are covered by a suitable insulator and are supported in a hollow frame 10 made of a suitable insulating material (plastics, glass, or other material) contained in an evacuated vessel, not shown. Each of upright needle electrodes 16 and 17, preferably in the form of a fine wire or a needle, is inserted into the bottle 12 or 13. The numbers of needle electrodes connected to respective electrodes 14 and 15 are equal. Each electrode is covered by a suitable insulator, preferably integral with the insulator covering respective plate electrodes 14 and 15 except the portion protruding into the bottle.

Plate electrodes 14 and 15 are connected to opposite terminals of a source of electric power supply having a drooping voltage-current characteristic, such as a leakage transformer, by way of conductors 20. The inner surfaces of bottles 12 and 13 are activated by glow discharge established between electrodes 16 and 17 at a reduced pressure of 0.05 to 0.5 torr. In this case, since the numbers of electrodes 16 and 17 on both plate electrodes are equal, the total surfaces of respective groups of needle electrodes between which glow discharge is created are equal. Accordingly, the inner surfaces of bottles 12 and 13 mounted on plate electrodes 14 and 15 will be subjected to the same degree of activation treatment.

Where it is desired to increase the number of bottles activated at one time, the surface areas of plate electrodes may be increased or the number of electrode plates may be increased. While it is preferable to use several pairs of plate electrode or an even number thereof and to connect alternate electrodes to opposite terminals of a source of power having a drooping voltage-current characteristic, it is also possible to employ three plate electrodes and to connect the middle electrode to one pole of the source, while the other two outer electrodes are connected to the other pole. In this case, however, as the bottle supported on the middle electrode is activated by a current which is twice that for bottles supported by the other electrodes, it is desirable to increase the period of activation in order to provide substantially equal activation for all bottles. Alternatively, where a pair of plate electrodes is used, bottles may be mounted on only one of them. In this case, the electrode that does not support any bottle may take the form of a bare plate electrode not covered by an electric insulator. For example, as diagrammatically shown in FIG. 5, one of the electrodes 15 may be constructed identical to the electrode 15 shown in FIG. 4 to support a number of hollow plastic articles 13, while the counter electrode may be a bare metal plate 14 which may be adjustably supported by the top of the glass jar 10.

Instead of bottles, the inner surfaces of tubes or hollow articles having a small inner diameter can also be activated with satisfactory results. Further, not only the inner surfaces, but also the outer surfaces of these articles can be activated. Such activated outer surfaces can be printed with ordinary printing ink, or provided with labels and the like cemented thereon.

In view of the above, it will be evident that many modifications and variations are possible in the light of the above teaching. It therefore is to be understood that within the scope of the appended claims the invention may be practiced otherwise than as specifically described.

What is claimed is:

1. In an apparatus for simultaneously activating the inner surfaces of a plurality of bottle shaped articles made of electrically nonconductive plastic capable of being activated by a glow discharge, comprising a supporting frame of an electric insulating material, an evacuated vessel in which said frame is disposed, a plurality of spaced-apart glow discharge electrodes supported by said supporting frame and respectively adapted to be received in the bottle shaped articles, at least one counterelectrode arranged to cooperate with said discharge electrodes, and a source of power having a drooping current-voltage characteristic is coupled to said electrodes to establish glow discharge between said discharge electrodes and counterelectrode, the improvement which comprises means disposed on said supporting frame supporting said articles in the upside down position, said means engaging the outer periphery of said article so that said plurality of discharge electrodes protrude into the interior of the respective articles, said discharge electrodes being spaced from all portions of the inner surface of said articles by an evacuated space.

2. The improvement according to claim 1 wherein there is a plurality of said counterelectrodes with one positioned in each article spaced from the glow discharge electrode to form a pair of spaced electrodes, and alternate electrodes being connected to opposite terminals of said source of power.

3. The improvement according to claim 1 further comprising a conductive member within the material of the supporting frame and electrically connected to said individual discharge electrodes, and the counterelectrode is a bare electrode plate cooperating with said plurality of individual discharge electrodes to establish glow discharge therebetween.

* * * * *